(12) United States Patent
Luo et al.

(10) Patent No.: US 10,612,799 B2
(45) Date of Patent: Apr. 7, 2020

(54) MULTI-SPLIT SYSTEM AND MEDIUM-PRESSURE CONTROLLING METHOD THEREOF

(71) Applicants: GD MIDEA HEATING & VENTILATING EQUIPMENT CO., LTD., Foshan, Guangdong (CN); MIDEA GROUP CO., LTD., Foshan, Guangdong (CN)

(72) Inventors: Bin Luo, Guangdong (CN); Yueming Li, Guangdong (CN)

( * ) Notice: Subject to any disclaimer, the term of this patent is extended or adjusted under 35 U.S.C. 154(b) by 427 days.

(21) Appl. No.: 15/329,939

(22) PCT Filed: Apr. 27, 2016

(86) PCT No.: PCT/CN2016/080407
§ 371 (c)(1),
(2) Date: Jan. 27, 2017

(87) PCT Pub. No.: WO2016/173497
PCT Pub. Date: Nov. 3, 2016

(65) Prior Publication Data
US 2017/0268791 A1   Sep. 21, 2017

(30) Foreign Application Priority Data

Apr. 28, 2015 (CN) .......................... 2015 1 0209682

(51) Int. Cl.
*F24F 3/06* (2006.01)
*F25B 13/00* (2006.01)
(Continued)

(52) U.S. Cl.
CPC ............ *F24F 3/06* (2013.01); *F24D 19/1084* (2013.01); *F25B 13/00* (2013.01); *F25B 41/003* (2013.01);
(Continued)

(58) Field of Classification Search
CPC .. F24F 3/06; F25B 13/00; F25B 49/02; F25B 41/003; F25B 41/062; F25B 2313/0272;
(Continued)

(56) References Cited

U.S. PATENT DOCUMENTS 4,483,156 A * 11/1984 Oudenhoven ........... F25B 39/00
62/324.1
4,987,747 A * 1/1991 Nakamura ............... F24F 3/065
62/160

(Continued)

FOREIGN PATENT DOCUMENTS

CN           1695034 A       11/2005
CN           1695034 B       11/2010
(Continued)

OTHER PUBLICATIONS

China Patent Office, Office action dated Sep. 5, 2016 for CN application 201510209682.1, which is a China counterpart application of the present US patent application.
(Continued)

*Primary Examiner* — Ljiljana V. Ciric
(74) *Attorney, Agent, or Firm* — Kilpatrick Townsend & Stockton, LLP (57) ABSTRACT

A multi-split system and a medium-pressure controlling method thereof. The multi-split system includes an outdoor unit, a distribution device, and a plurality of indoor units. The distribution device includes a gas-liquid separator, a first heat exchange assembly, a first electronic expansion valve, a second heat exchange assembly and a second electronic expansion valve. The distribution device is configured to perform a routine correction on a medium-pressure control target value of the first electronic expansion valve according to the subcooling degree of the heating indoor unit, the outlet air temperature of the heating indoor unit and the opening of the throttling element in the heating (Continued)

indoor unit, and to correct a current medium-pressure control target value of the first electronic expansion valve according to a preset step when the opening of the throttling element reaches a maximum opening or a minimum opening and lasts for a first preset time.

17 Claims, 6 Drawing Sheets

(51) Int. Cl.
    *F25B 49/02*     (2006.01)
    *F24D 19/10*     (2006.01)
    *F25B 41/00*     (2006.01)
    *F25B 41/06*     (2006.01)
    *G05D 23/19*     (2006.01)

(52) U.S. Cl.
    CPC ............ *F25B 41/062* (2013.01); *F25B 49/02* (2013.01); *G05D 23/1934* (2013.01); *F25B 2313/006* (2013.01); *F25B 2313/0231* (2013.01); *F25B 2313/0233* (2013.01); *F25B 2313/0272* (2013.01); *F25B 2341/065* (2013.01); *F25B 2400/23* (2013.01); *F25B 2600/01* (2013.01); *F25B 2600/23* (2013.01); *F25B 2600/2509* (2013.01); *F25B 2600/2513* (2013.01); *F25B 2700/2104* (2013.01); *F25B 2700/2106* (2013.01)

(58) Field of Classification Search
    CPC ........ F25B 2313/006; F25B 2313/0233; F25B 2600/01; F25B 2600/2509; F25B 2400/23; F25B 2700/2106; F25B 2700/2104; F25B 2600/23; F25B 2313/0231; F25B 2341/065; F24D 19/1084; G05D 23/1934
    See application file for complete search history.

(56) References Cited

U.S. PATENT DOCUMENTS

| | | | | |
|---|---|---|---|---|
| 5,237,833 | A * | 8/1993 | Hayashida | F24F 3/065 62/228.1 |
| 5,297,392 | A * | 3/1994 | Takata | F24F 3/065 236/49.3 |
| 5,755,104 | A * | 5/1998 | Rafalovich | F25B 13/00 62/205 |
| 10,421,337 | B2 * | 9/2019 | Miyakoshi | F25B 49/005 |
| 2002/0026803 | A1 * | 3/2002 | Inoue | F25B 13/00 62/228.3 |
| 2006/0254294 | A1 * | 11/2006 | Shimamoto | F24F 3/065 62/238.7 |
| 2009/0241573 | A1 * | 10/2009 | Ikegami | B60H 1/00335 62/238.7 |
| 2011/0023512 | A1 * | 2/2011 | Kawagoe | F25B 13/00 62/196.1 |
| 2014/0182329 | A1 * | 7/2014 | Yamashita | F25B 13/00 62/498 |
| 2015/0292777 | A1 * | 10/2015 | Okano | F25B 5/02 62/129 |
| 2015/0298525 | A1 * | 10/2015 | Miyakoshi | F25B 49/005 62/160 |
| 2015/0308701 | A1 * | 10/2015 | Yamashita | F25B 9/006 62/196.1 |
| 2015/0316275 | A1 * | 11/2015 | Yamashita | F25B 13/00 62/228.1 |
| 2015/0338121 | A1 * | 11/2015 | Yamashita | F24F 5/001 62/196.1 |
| 2015/0354878 | A1 * | 12/2015 | Yamashita | F25B 1/10 62/160 |
| 2015/0362235 | A1 * | 12/2015 | Yamashita | F25B 1/10 62/196.1 |
| 2016/0082810 | A1 * | 3/2016 | Suzuki | B60H 1/00921 62/151 |
| 2016/0084554 | A1 * | 3/2016 | Suzuki | F25B 47/022 62/160 |
| 2016/0084555 | A1 * | 3/2016 | Suzuki | F25B 47/022 62/151 |
| 2016/0185186 | A1 * | 6/2016 | Miyakoshi | B60H 1/00385 62/160 |
| 2016/0193896 | A1 * | 7/2016 | Miyakoshi | B60H 1/00385 62/155 |
| 2016/0201959 | A1 * | 7/2016 | Miyakoshi | F25B 31/008 62/155 |
| 2016/0201960 | A1 * | 7/2016 | Miyakoshi | B60H 1/00385 62/154 |
| 2016/0201961 | A1 * | 7/2016 | Miyakoshi | B60H 1/00921 62/133 |
| 2016/0236538 | A1 * | 8/2016 | Suzuki | B60H 1/00921 |
| 2017/0080778 | A1 * | 3/2017 | Suzuki | B60H 1/00864 |
| 2017/0210202 | A1 * | 7/2017 | Suzuki | F25B 5/04 |
| 2017/0225542 | A1 * | 8/2017 | Suzuki | B60H 1/00921 |
| 2017/0282689 | A1 * | 10/2017 | Miyakoshi | F25B 49/02 |
| 2017/0284712 | A1 * | 10/2017 | Ugajin | F25B 49/027 |
| 2018/0178629 | A1 * | 6/2018 | Suzuki | B60H 1/00921 |
| 2018/0194191 | A1 * | 7/2018 | Suzuki | B60H 1/3216 |
| 2018/0354342 | A1 * | 12/2018 | Miyakoshi | B60H 1/00921 |
| 2018/0370329 | A1 * | 12/2018 | Ishizeki | B60H 1/0073 |
| 2019/0023100 | A1 * | 1/2019 | Suzuki | F25B 41/043 |
| 2019/0049154 | A1 * | 2/2019 | Ikeda | F25B 13/00 |
| 2019/0248209 | A1 * | 8/2019 | Ishizeki | B60H 1/00978 |

FOREIGN PATENT DOCUMENTS

| | | |
|---|---|---|
| CN | 104776630 A | 7/2015 |
| WO | 2014054091 A1 | 4/2014 |

OTHER PUBLICATIONS

WIPO, ISR and written opinions dated Aug. 2, 2016 for PCT application PCT/CN2016/080407.

* cited by examiner

MULTI-SPLIT SYSTEM AND MEDIUM-PRESSURE CONTROLLING METHOD THEREOF

CROSS-REFERENCE TO RELATED APPLICATION

The present application is a national phase entry under 35 USC § 371 of International Application PCT/CN2016/080407, filed Apr. 27, 2016, which claims the benefit of and priority to Chinese Patent Application No. 201510209682.1, filed Apr. 28, 2015, the entire disclosures of which are incorporated herein by reference.

FIELD

The present disclosure relates to air conditioning field, and more particularly, to a multi-split system and a medium-pressure controlling method thereof.

BACKGROUND

With the continuous development of air conditioning technology and strengthening of people's environment protection consciousness, a heat recovery multi-split system is more and more popular in the market, and a two-pipe heat recovery multi-split system is one of the dominant heat recovery multi-split systems on the current market. When the two-pipe heat recovery multi-split system operates under a main cooling mode, a gas-liquid two-phase refrigerant with a certain degree of dryness is input into an indoor unit from an outdoor unit. In theory, a constant value control of the dryness of the gas-liquid two-phase refrigerant may be realized as long as an outdoor heat exchanger is controlled fine enough such that better effects of both of cooling and heating indoor units may be achieved. However, in practice, it is often the case that there is more liquid than gas or more gas than liquid.

In the related art, in order to make both of the cooling and heating indoor units may achieve good effects, a liquid refrigerant needs to be distributed to a cooling indoor unit and a gaseous refrigerant needs to be distributed to a heating indoor unit according to an appropriate proportion, and the distribution of refrigerants of the cooling and heating indoor units is usually realized by adjusting a pressure difference between the front and back of a first electronic expansion valve in the distribution device. However, the pressure difference between the front and back of the first electronic expansion valve in a distribution device is controlled according to a certain value or within a certain range, because such a control strategy is often performed based on data acquired on the basis of various simulation experiments by manufacturers, which not only has a limited adjustment range, but also is not smart enough, and hard to make the system to operate in a better status.

SUMMARY

The present disclosure is made based on the inventor's understanding and research of the following problems:

When a medium-pressure control over a first electronic expansion valve in a distribution device is unreasonable, it is likely to cause an insufficient or excessive refrigerant of a heating indoor unit. When a PI control over a throttling element (such as an electronic expansion valve) in the heating indoor unit is performed, the corresponding valve opening is adjusted according to a target subcooling degree. When the refrigerant is insufficient, the subcooling degree is high, and the electronic expansion valve in the heating indoor unit will widen the opening correspondingly to lower the subcooling degree; and when the refrigerant is excessive, the subcooling degree is low, and the electronic expansion valve in the heating indoor unit will narrow the opening correspondingly to increase the subcooling degree. However, when the target of the medium-pressure control is unreasonable, the subcooling degree of the heating indoor unit has been in a high or low status, and the electronic expansion valve will keep widening or narrowing the opening correspondingly until the opening is maximized or minimized. At this moment, since it already goes beyond the adjustment range of the electronic expansion valve of the heating indoor unit, such that the opening is always in a normally open status. In this case, the medium-pressure control target value needs to be corrected to make the refrigerant be reasonably redistributed.

The present disclosure aims to at least solve one of the technical problems.

Therefore, an objective of the present disclosure is to provide a multi-split system and a medium-pressure controlling method thereof, such that the medium-pressure control target value of the first electronic expansion valve in the distribution device may be corrected according to an opening of the throttling element in the operating heating indoor unit, which makes the refrigerant be redistributed appropriately, and thus the heating effect of the heating indoor unit may be guaranteed.

To achieve the above objective, embodiments of an aspect of the present disclosure provide a multi-split system, including an outdoor unit, a distribution device, and a plurality of indoor units, in which the distribution device includes a gas-liquid separator, a first heat exchange assembly, a first electronic expansion valve, a second heat exchange assembly and a second electronic expansion valve. The distribution device is configured to control the first electronic expansion valve by a preset medium-pressure initial control target value, and to acquire a subcooling degree of a heating indoor unit in the plurality of indoor units, an outlet air temperature of the heating indoor unit and an opening of a throttling element in the heating indoor unit, and to perform a routine correction on a medium-pressure control target value of the first electronic expansion valve according to the subcooling degree of the heating indoor unit, the outlet air temperature of the heating indoor unit and the opening of the throttling element in the heating indoor unit, and to correct a current medium-pressure control target value of the first electronic expansion valve according to a preset step when the opening of the throttling element in the heating indoor unit reaches a maximum opening or a minimum opening and lasts for a first preset time.

By the multi-split system according to embodiments of the present disclosure, the distribution device controls the first electronic expansion valve by a preset medium-pressure initial control target value first, then acquires a sub cooling degree of the heating indoor unit in the plurality of indoor units, an outlet air temperature of the heating indoor unit and an opening of the throttling element in the heating indoor unit, and performs a routine correction on the medium-pressure control target value of the first electronic expansion valve according to the subcooling degree of the heating indoor unit, the outlet air temperature of the heating indoor unit and the opening of the throttling element in the heating indoor unit, and finally when the opening of the throttling element in the heating indoor unit reaches a maximum opening or a minimum opening and lasts for a first preset time, the distribution device corrects the current medium-pressure control target value of the first electronic expansion valve according to a preset step, such that the medium-pressure control target value of the first electronic expansion valve may be corrected according to the opening of the throttling element in the operating heating indoor unit, and thus an appropriate distribution of a refrigerant flowing into the heating indoor unit may be realized, and a problem that the heating effect is not good due to an uneven distribution of the refrigerant is solved, and the heating effect of the heating indoor unit is guaranteed.

According to an embodiment of the present disclosure, if the opening of the throttling element in the heating indoor unit reaches the maximum opening and lasts for the first preset time, the distribution device increases the current medium-pressure control target value according to the preset step.

According to an embodiment of the present disclosure, if the opening of the throttling element in the heating indoor unit reaches the minimum opening and lasts for the first preset time, the distribution device decreases the current medium-pressure control target value according to the preset step.

Specifically, the first preset time is in a range of 4 to 6 minutes, and the preset step is in a range of 0.05 to 0.15 Mpa.

In embodiments of the present disclosure, the multi-split system works under a main cooling mode.

According to an embodiment of the present disclosure, when the multi-split system starts operating for a second preset time, the distribution device controls the first electronic expansion valve by the preset medium-pressure initial control target value.

In an embodiment, the second preset time is in a range of 10 to 20 minutes.

To achieve the above objective, embodiments of another aspect of the present disclosure provide a medium-pressure controlling method of a multi-split system, in which the multi-split system includes an outdoor unit, a distribution device and a plurality of indoor units, and the distribution device includes a gas-liquid separator, a first heat exchange assembly, a first electronic expansion valve, a second heat exchange assembly and a second electronic expansion valve. The medium-pressure controlling method includes steps of: controlling the first electronic expansion valve by a preset medium-pressure initial control target value when the multi-split system works under a main cooling mode; acquiring a subcooling degree of a heating indoor unit in the plurality of indoor units, an outlet air temperature of the heating indoor unit and an opening of a throttling element in the heating indoor unit; performing a routine correction on a medium-pressure control target value of the first electronic expansion valve according to the subcooling degree of the heating indoor unit, the outlet air temperature of the heating indoor unit and the opening of the throttling element in the heating indoor unit, and correcting a current medium-pressure control target value of the first electronic expansion valve according to a preset step when the opening of the throttling element in the heating indoor unit reaches a maximum opening or a minimum opening and lasts for a first preset time.

By the medium-pressure controlling method of the multi-split system according to embodiments of the present disclosure, when the multi-split system works under a main cooling mode, a first electronic expansion valve is controlled by a preset medium-pressure initial control target value, then a subcooling degree of the heating indoor unit in the plurality of indoor units, an outlet air temperature of the heating indoor unit and an opening of the throttling element in the heating indoor unit are acquired, then a routine correction is performed on the medium-pressure control target value of the first electronic expansion valve according to the subcooling degree of the heating indoor unit, the outlet air temperature of the heating indoor unit and the opening of the throttling element in the heating indoor unit, and finally when the opening of the throttling element in the heating indoor unit reaches a maximum opening or a minimum opening and lasts for a first preset time, the current medium-pressure control target value of the first electronic expansion valve is corrected according to a preset step, such that the medium-pressure control target value of the first electronic expansion valve may be corrected according to the opening of the throttling element in the operating heating indoor unit, and thus an appropriate distribution of a refrigerant flowing into the heating indoor unit may be realized, and a problem that the heating effect is not good due to an uneven distribution of the refrigerant is solved, and the heating effect of the heating indoor unit is guaranteed.

According to an embodiment of the present disclosure, if the opening of the throttling element in the heating indoor unit reaches the maximum opening and lasts for the first preset time, the current medium-pressure control target value is increased according to the preset step.

According to an embodiment of the present disclosure, if the opening of the throttling element in the heating indoor unit reaches the minimum opening and lasts for the first preset time, the current medium-pressure control target value is decreased according to the preset step.

Specifically, the first preset time is in a range of 4 to 6 minutes, and the preset step is in a range of 0.05 to 0.15 Mpa.

According to an embodiment of the present disclosure, when the multi-split system starts operating for a second preset time, the first electronic expansion valve is controlled by the preset medium-pressure initial control target value.

In an embodiment, the second preset time may be in a range of 10 to 20 minutes.

Additional aspects and advantages of the present disclosure will be given in part in the following descriptions, become apparent in part from the following description, or be learned from the practice of the present disclosure.

BRIEF DESCRIPTION OF THE DRAWINGS

These and other aspects and advantages of the present disclosure will become apparent and more readily from the following descriptions taken in conjunction with the drawings, in which.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Next, a multi-split system and a medium-pressure controlling method thereof according to embodiments of the present disclosure will be described by referring to the accompanying drawings.

As shown in FIG. 1 to FIG. 5, the multi-split system according to embodiments of the present disclosure includes: an outdoor unit 10, a plurality of indoor units (such as four indoor units 21, 22, 23, 24) and a distribution device 30.

The outdoor unit 10 includes a compressor 101, a four-way valve 102, an outdoor heat exchanger 103, an outdoor gas-liquid separator 104, an oil separator 105, a first electromagnetic valve 106, a capillary 107, four one-way valves 108A, 108B, 108C, 108D, a first interface 109 and a second interface 110. The compressor 101 has an exhaust port and a gas returning port, and the four-way valve 102 has a first valve port to a fourth valve port, in which the first valve port is communicated with one of the second valve port and the third valve port, and the fourth valve port is communicated with the other one of the second valve port and the third valve port, and the first valve port is communicated with the exhaust port of the compressor 101 through the oil separator 105, and the fourth valve port is communicated with the gas returning port of the compressor 101 through the outdoor gas-liquid separator 104, and the one-way valve 108A is connected in series between the second valve port and the first interface 109, and the third valve port is connected to a first end of the outdoor heat exchanger 103.

The distribution device 30 includes a gas-liquid separator 301, a plurality of first controlling valves (such as four first controlling valves 302A, 302B, 302C, 302D), a plurality of second controlling valves (such as four second controlling valves 303A, 303B, 303C, 303D), a first electronic expansion valve 304A, a second electronic expansion valve 304B, four first one-way valves 305A, 305B, 305C, 305D, four second one-way valves 306A, 306B, 306C, 306D, a first heat exchange assembly 307A and a second heat exchange assembly 307B. The gas-liquid separator 301 has an inlet, a gas outlet and a liquid outlet, the inlet is connected to a second end of the outdoor heat exchanger 103 through a high-pressure stop valve 40 and the one-way valve 108B, the gas outlet is connected to the four second controlling valves 303A, 303B, 303C, 303D respectively; the four first controlling valves 302A, 302B, 302C, 302D are connected to the first interface 109 through the low-pressure stop valve 50 respectively. The first heat exchange assembly 307A and the second heat exchange assembly 307B may be plate heat exchangers, and may also be double-pipe heat exchangers.

As shown in FIG. 1 to FIG. 5, the first end of the one-way valve 108A is connected between the one-way valve 108B and the second interface 110 through the one-way valve 108C, and the second end of the one-way valve 108A is connected between the one-way valve 108B and the outdoor heat exchanger 103 through the one-way valve 108D.

The first heat exchange assembly 307A and the second heat exchange assembly 307B each have a first heat exchange flow path and a second heat exchange flow path, and the liquid outlet of the gas-liquid separator 301 is connected to the first heat exchange flow path of the first heat exchange assembly 307A, and the first heat exchange flow path of the first heat exchange assembly 307A is connected to the first electronic expansion valve 304A, and the second heat exchange flow path of the first heat exchange assembly 307A is connected to the second heat exchange flow path of the second heat exchange assembly 307B and the four first controlling valves 302A, 302B, 302C, 302D respectively.

As shown in FIG. 1 to FIG. 5, each indoor unit includes an indoor heat exchanger and a throttling element. The indoor unit 21 includes an indoor heat exchanger 211 and a throttling element 212, and the indoor unit 22 includes an indoor heat exchanger 221 and a throttling element 222, and the indoor unit 23 includes an indoor heat exchanger 231 and a throttling element 232, and the indoor unit 24 includes an indoor heat exchanger 241 and a throttling element 242. The first end of the indoor heat exchanger in each indoor unit is connected to the corresponding throttling element, the second end of the indoor heat exchanger in each indoor unit is connected to the corresponding first controlling valve and second controlling valve, and the throttling element in each indoor unit is connected to the corresponding first one-way valve and the second one-way valve, and the flow direction of the first one-way valve is opposite to the flow direction of the second one-way valve. Moreover, the four first one-way valves 305A, 305B, 305C, 305D are all connected to a first common flow path, and the four second one-way valves 306A, 306B, 306C, 306D are all connected to a second common flow path, and the first heat exchange flow path of the second heat exchange assembly 307B is communicated with the first common flow path and the second common flow path respectively, and the first electronic expansion valve 304A is connected to the first common flow path, and the second electronic expansion valve 304B is connected to the second heat exchange flow path of the second heat exchange assembly 307B and the second common flow path respectively, and the first electronic expansion valve 304A is further connected with the second electromagnetic valve 308 in parallel.

In embodiments of the present disclosure, the distribution device 30 is configured to control the first electronic expansion valve 304A by a preset medium-pressure initial control target value, and to acquire a subcooling degree of a heating indoor unit in a plurality of indoor units, an outlet air temperature of the heating indoor unit and an opening of the throttling element in the heating indoor unit, and to perform a routine correction on a medium-pressure control target value of the first electronic expansion valve according to the subcooling value of the heating indoor unit, the outlet air temperature of the heating indoor unit and the opening of the throttling element in the heating indoor unit, and to correct the current medium-pressure control target value of the first electronic expansion valve according to a preset step when the opening of the throttling element in the heating indoor unit reaches a maximum opening or a minimum opening and lasts for a first preset time. The routine correction exactly refers to performing a PID adjustment on the medium-pressure control target value of the first electronic expansion valve according to the subcooling degree of the heating indoor unit, the outlet air temperature of the heating indoor unit and the opening of the throttling element in the heating indoor unit.

It should be noted that, the maximum opening and the minimum opening may be standardized according to the specific situations of the throttling element in the heating indoor unit.

If the opening of the throttling element in the heating indoor unit reaches the maximum opening and lasts for the first preset time, the distribution device 30 increases the current medium-pressure control target value according to the preset step. If the opening of the throttling element in the heating indoor unit reaches the minimum opening and lasts for the first preset time, the distribution device 30 decreases the current medium-pressure control target value according to the preset step.

Specifically, the first preset time may be in a range of 4 to 6 minutes, and the preset step may be in a range of 0.05 to 0.15 Mpa.

According to an embodiment of the present disclosure, as shown in FIG. 1 to FIG. 5, a pressure sensor 309A and a pressure sensor 309B are provided at two ends of the first electronic expansion valve 304A and the second electromagnetic valve 308 in parallel connection respectively, and a temperature sensor 310A and a temperature sensor 310B are provided at two ends of the first heat exchange flow path of the second heat exchange assembly 307B respectively. In addition, a pressure sensor 309C is provided at one end of the second heat exchange flow path of the first heat exchange assembly 307A.

The medium-pressure in embodiments of the present disclosure refers to a pressure difference value between the pressure value detected by the pressure sensor 309A and the pressure value detected by the pressure sensor 309B, and the first electronic expansion valve is controlled by correcting the medium-pressure control target value.

In embodiments of the present disclosure, when working under a main cooling mode, the multi-split system controls the medium-pressure. It should be noted that, the operation mode of the multi-split system further includes a pure cooling mode, a pure heating mode and a main heating mode.

Next, flow directions of refrigerants when the multi-split system works under a pure heating mode, a main heating mode, a pure cooling mode and a main cooling mode will be described respectively by referring to FIG. 2 to FIG. 5.

Figure 1:
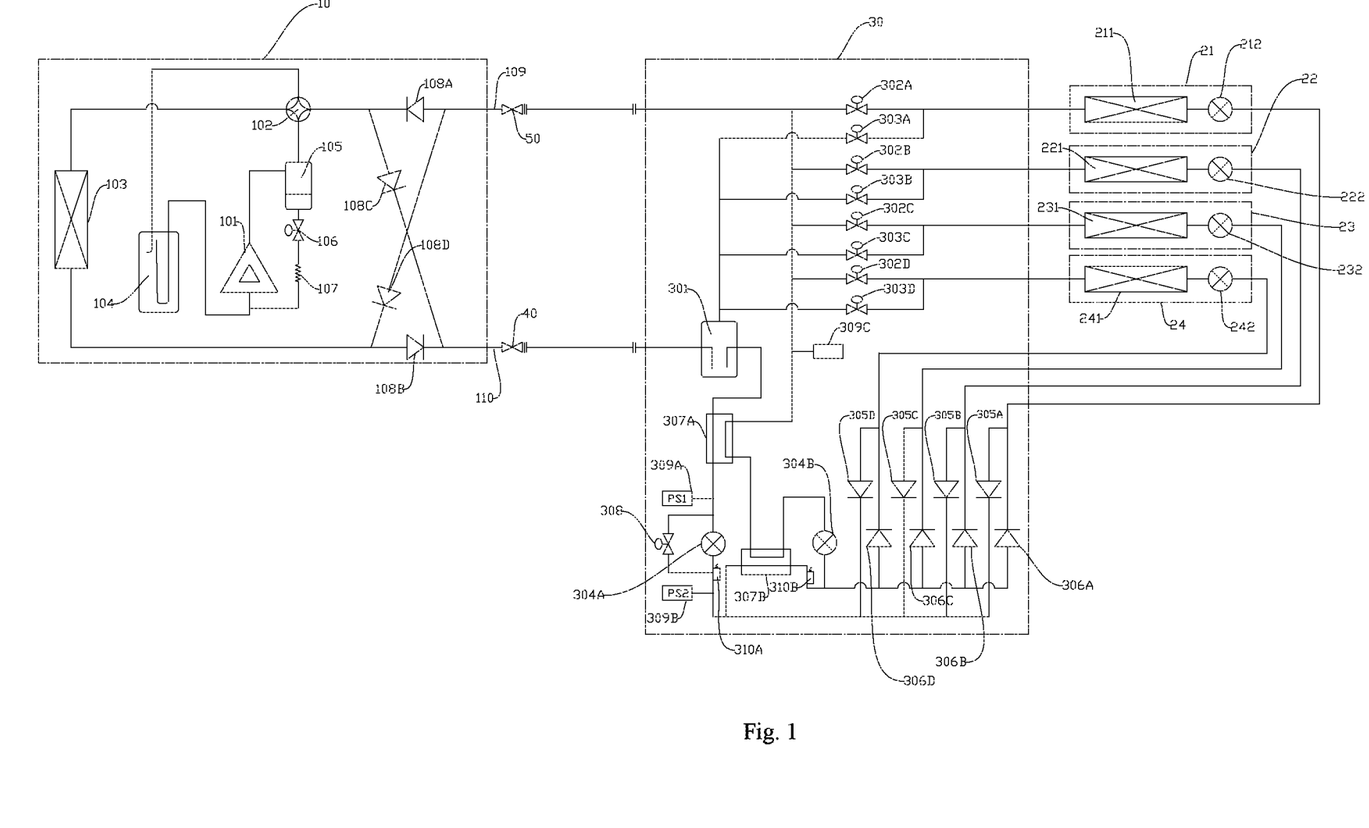
FIG. 1 is a schematic view of a multi-split system according to an embodiment of the present disclosure.
Figure 2:
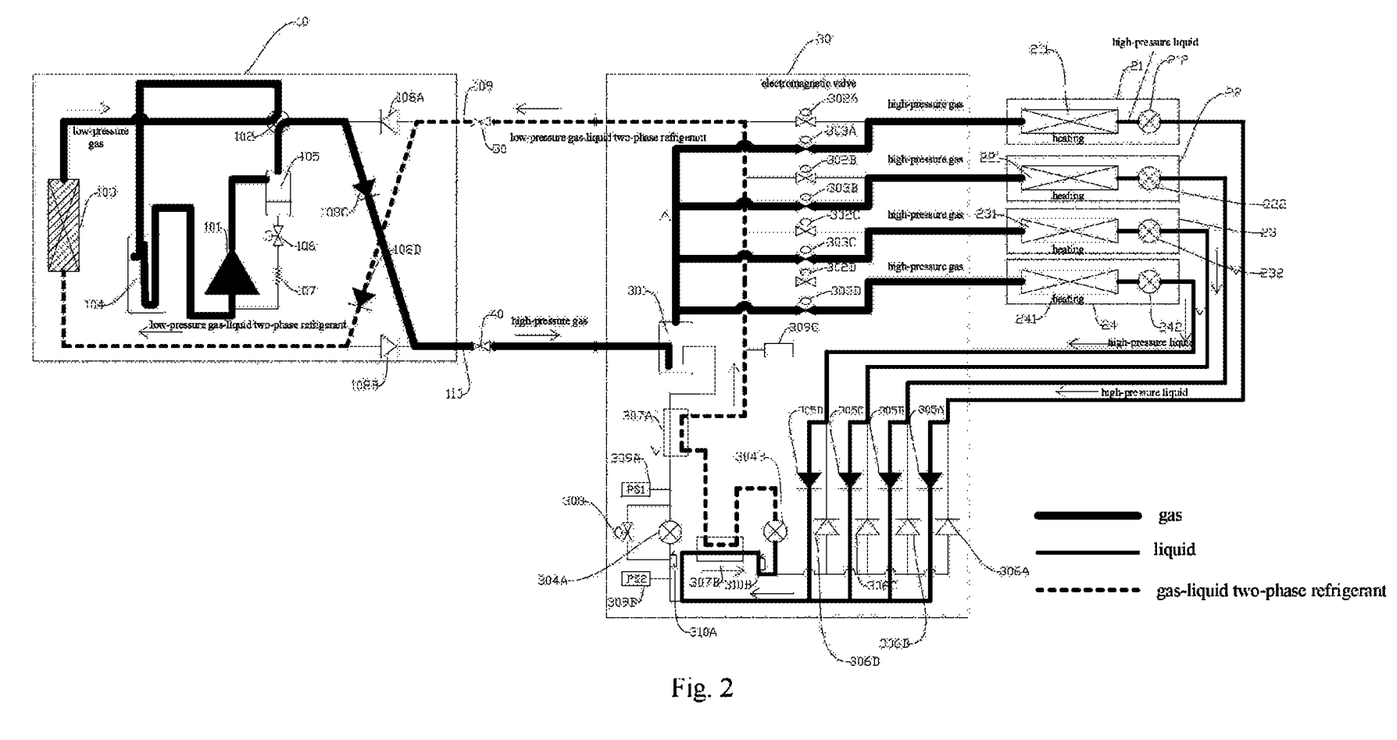
FIG. 2 is a schematic view of a multi-split system operating under a pure heating mode according to an embodiment of the present disclosure.

As shown in FIG. 2, when the outdoor unit 10 determines that the multi-split system works under a pure heating mode, the four indoor units perform heating work. The flow direction of a refrigerant will be described as follows: a high-pressure gas flows into the four-way valve 102 through the oil separator 105 from the exhaust port of the compressor 101, then flows into the gas-liquid separator 301 via the one-way valve 108C, the second interface 110 and the high-pressure stop valve 40, and the high-pressure gas flows into the corresponding four indoor heat exchangers via the four second controlling valves 303A, 303B, 303C, 303D respectively from the gas outlet of the gas-liquid separator 301, and then turns into a high-pressure liquid; then, the four-way high-pressure liquid flows into the first heat exchange flow path of the second heat exchange assembly 307B via the corresponding throttling elements and the four first one-way valves 305A, 305B, 305C, 305D, and turns into a low-pressure gas-liquid two-phase refrigerant via the second electronic expansion valve 304B; the low-pressure gas-liquid two-phase refrigerant flows back to the outdoor unit 10 via the second heat exchange flow path of the second heat exchange assembly 307B and the second heat exchange flow path of the first heat exchange assembly 307A, that is, the low-pressure gas-liquid two-phase refrigerant turns into a low-pressure gas after flowing back to the outdoor heat exchanger 103 via the low-pressure stop valve 50, the first interface 109 and the one-way valve 108D, and the low-pressure gas flows back to the gas returning port of the compressor 101 via the four-way valve 102 and the outdoor gas-liquid separator 104.

Figure 3:
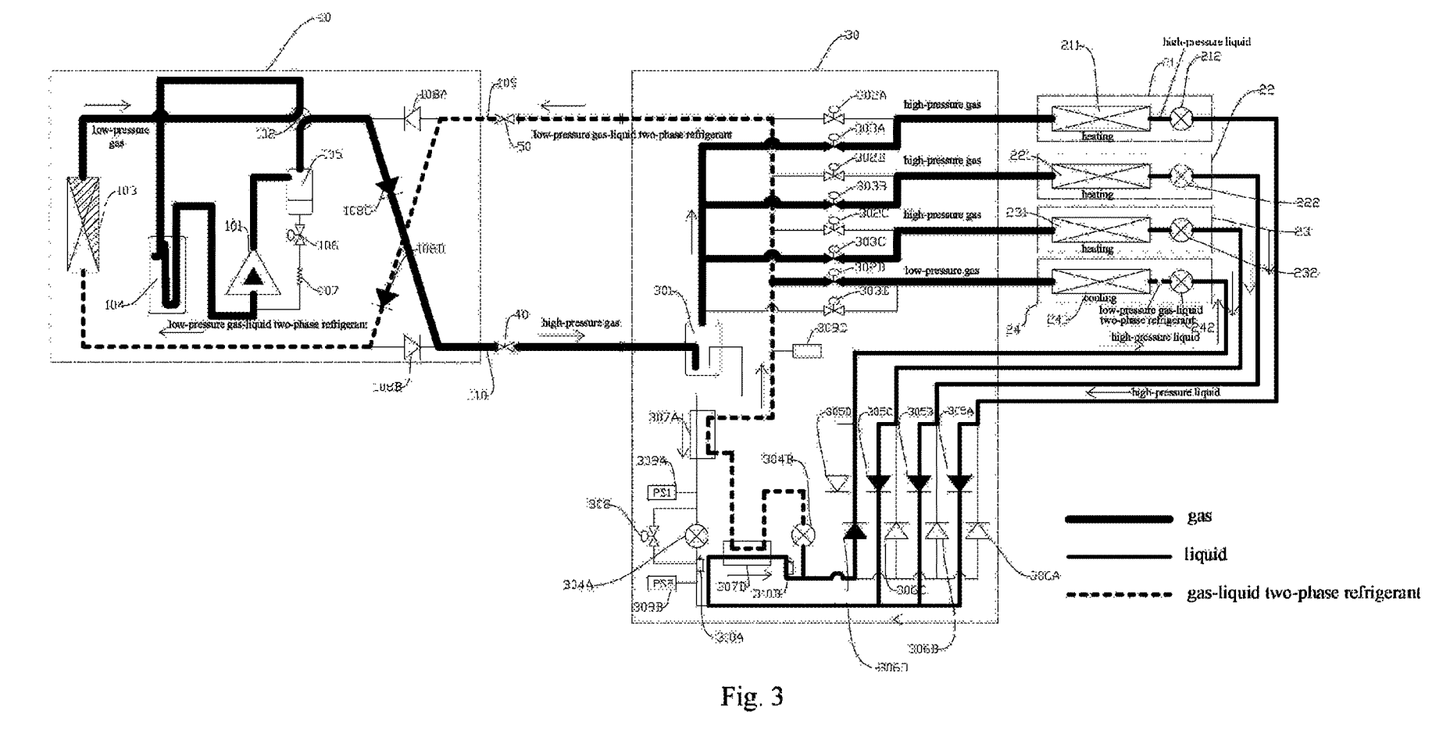
FIG. 3 is a schematic view of a multi-split system operating under a main heating mode according to an embodiment of the present disclosure.

As shown in FIG. 3, when the outdoor unit 10 determines that the multi-split system works under a main heating mode, three of the four indoor units perform heating work, and one indoor unit performs cooling work. The flow direction of a refrigerant for heating will be described as follows: a high-pressure gas flows into the four-way valve 102 through the oil separator 105 from the exhaust port of the compressor 101, then flows into the gas-liquid separator 301 via the one-way valve 108C, the second interface 110 and the high-pressure stop valve 40, and the high-pressure gas flows into the indoor heat exchangers in the corresponding three heating indoor units via the three second controlling valves 303A, 303B, 303C respectively from the gas outlet of the gas-liquid separator 301, then turns into a high-pressure liquid, and then the three-way high-pressure liquid flows into the first heat exchange flow path of the second heat exchange assembly 307B via the corresponding throttling elements and the three first one-way valves 305A, 305B, 305C, and turns into a low-pressure gas-liquid two-phase refrigerant via the second electronic expansion valve 304B, and the low-pressure gas-liquid two-phase refrigerant flows back to the outdoor unit 10 via the second heat exchange flow path of the second heat exchange assembly 307B and the second heat exchange flow path of the first heat exchange assembly 307A, that is, the low-pressure gas-liquid two-phase refrigerant turns into a low-pressure gas after flowing back to the outdoor heat exchanger 103 via the low-pressure stop valve 50, the first interface 109 and the one-way valve 108D, and the low-pressure gas flows back to the gas returning port of the compressor 101 via the four-way valve 102 and the outdoor gas-liquid separator 104. The flow direction of a refrigerant for cooling will be described as follows: a part of the high-pressure liquid flowing through the first heat exchange flow path of the second heat exchange assembly 307B further turns into a low-pressure gas-liquid two-phase refrigerant after flowing into the throttling element 242 in the indoor unit 24 via the second one-way valve 306D, then turns into a low-pressure gas via the indoor heat exchanger 241 in the indoor unit 24; after flowing through the first controlling valve 302D, the low-pressure gas flows back to the outdoor unit 10 after being mixed with the low-pressure gas-liquid two-phase refrigerant flowing through the second heat exchange flow path of the second heat exchange assembly 307B and the second heat exchange flow path of the first heat exchange assembly 307A.

Figure 4:
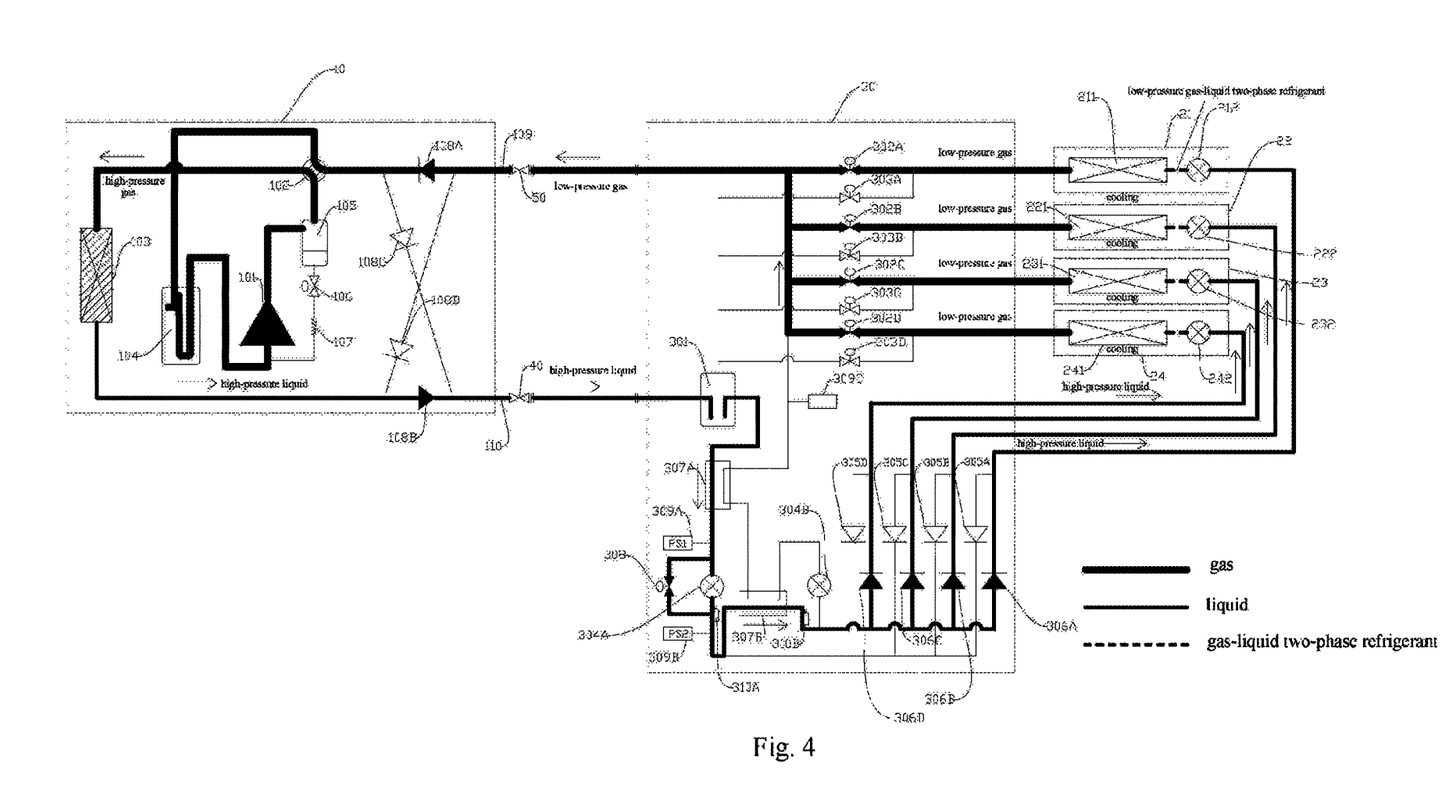
FIG. 4 is a schematic view of a multi-split system operating under a pure cooling mode according to an embodiment of the present disclosure.

As shown in FIG. 4, when the outdoor unit 10 determines that the multi-split system works under a pure cooling mode, the four indoor units perform cooling work. The flow direction of a refrigerant will be described as follows: a high-pressure gas flows into the four-way valve 102 through the oil separator 105 from the exhaust port of the compressor 101, then turns into a high-pressure liquid after flowing through the outdoor heat exchanger 103, and the high-pressure liquid flows into the gas-liquid separator 301 via the one-way valve 108B, the second interface 110 and the high-pressure stop valve 40, and the high-pressure liquid flows into the first electronic expansion valve 304A and the second electromagnetic valve 308 via the first heat exchange flow path of the first heat exchange assembly 307A from the liquid outlet of the gas-liquid separator 301, then flows into the four second one-way valves 306A, 306B, 306C, 306D respectively via the first heat exchange flow path of the second heat exchange assembly 307B, and the four-way high-pressure liquid flowing through the four second one-way valves 306A, 306B, 306C, 306D turns into a four-way low-pressure gas-liquid two-phase refrigerant after correspondingly flowing through the throttling elements in the four indoor units respectively, and the four-way low-pressure gas-liquid two-phase refrigerant turns into a four-way low-pressure gas after flowing through the corresponding indoor heat exchangers respectively, and then the low-pressure gas flows back to the outdoor unit 10 correspondingly via the four first controlling valves 302A, 302B, 302C, 302D, that is, the low-pressure gas flows back to the gas returning port of the compressor 101 via the low-pressure stop valve 50, the first interface 109, the one-way valve 108A and the outdoor gas-liquid separator 104.

Figure 5:
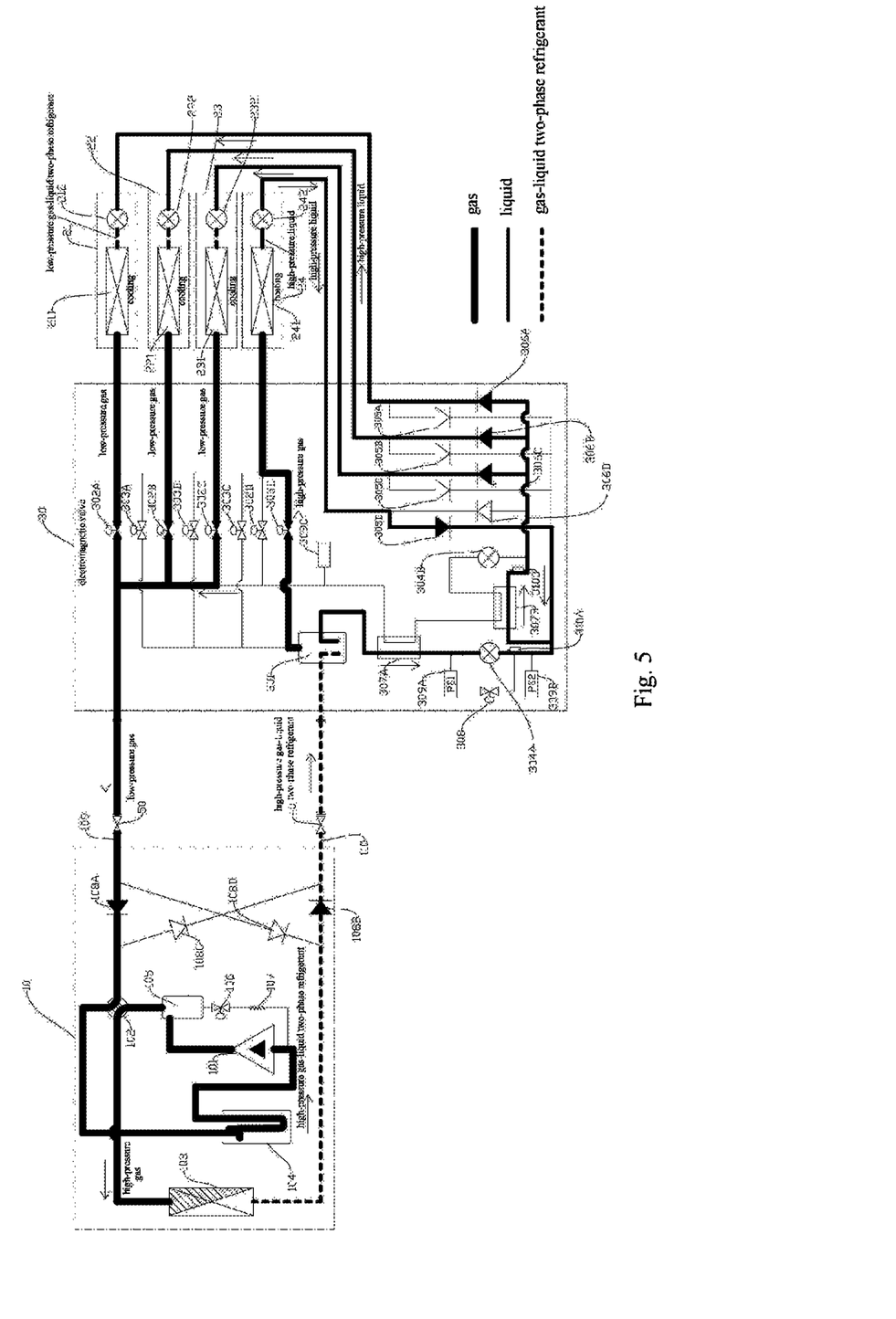
FIG. 5 is a schematic view of a multi-split system operating under a main cooling mode according to an embodiment of the present disclosure.

As shown in FIG. 5, when the outdoor unit 10 determines that the multi-split system works under a main cooling mode, three of the four indoor units perform cooling works and one indoor unit performs heating work. The flow direction of a refrigerant for cooling will be described as follows: a high-pressure gas flows into the four-way valve 102 through the oil separator 105 from the exhaust port of the compressor 101, then turns into a high-pressure gas-liquid two-phase refrigerant after flowing through the outdoor heat exchanger 103, and the high-pressure gas-liquid two-phase refrigerant flows into the gas-liquid separator 301 via the one-way valve 108B, the second interface 110 and the high-pressure stop valve 40 to perform a gas-liquid separation, in which the high-pressure liquid flows into the first electronic expansion valve 304A and the second electromagnetic valve 308 via the first heat exchange flow path of the first heat exchange assembly 307A from the liquid outlet of the gas-liquid separator 301, then flows into the three second one-way valves 306A, 306B, 306C via the first heat exchange flow path of the second heat exchange assembly 307B respectively, the three-way high-pressure liquid flowing through the three second one-way valves 306A, 306B, 306C turns into a three-way low-pressure gas-liquid two-phase refrigerant after correspondingly flowing through throttling elements in the three indoor units respectively, and the three-way low-pressure gas-liquid two-phase refrigerant turns into three-way low-pressure gas after flowing through the corresponding indoor heat exchangers respectively, then flows back to the outdoor unit 10 correspondingly via the three first controlling valves 302A, 302B, 302C, that is, the low-pressure gas flows back to the gas returning port of the compressor 101 via the low-pressure stop valve 50, the first interface 109, the one-way valve 108A, and the outdoor gas-liquid separator 104. The flow direction of a refrigerant for heating will be described as follows: a high-pressure gas after the gas-liquid separation through the gas-liquid separator 301 flows into the indoor heat exchanger 241 in the indoor unit 24 via the second controlling valve 303D from the gas outlet of the gas-liquid separator 301, then turns into a high-pressure liquid; and after flowing through the throttling element 242 in the indoor unit 24, the high-pressure liquid joins the high-pressure liquid flowing through the first heat exchange flow path of the second heat exchange assembly 307B via the first one-way valve 305D.

In embodiments of the present disclosure, in order to realize an automatic control over the pressure difference between the front and back of the first electronic expansion valve 304A, each indoor unit needs to send an operating parameter of the indoor unit to the distribution device 30, in which the operating parameter of each indoor unit includes: an operating mode of the indoor unit (such as a cooling mode, a heating mode, etc.), a superheat degree when the indoor unit serves as a cooling indoor unit, an opening of the throttling element when the indoor unit serves as a cooling indoor unit, a subcooling degree when the indoor unit serves as a heating indoor unit, an opening of the throttling element when the indoor unit serves as a heating indoor unit, etc.

Figure 6:
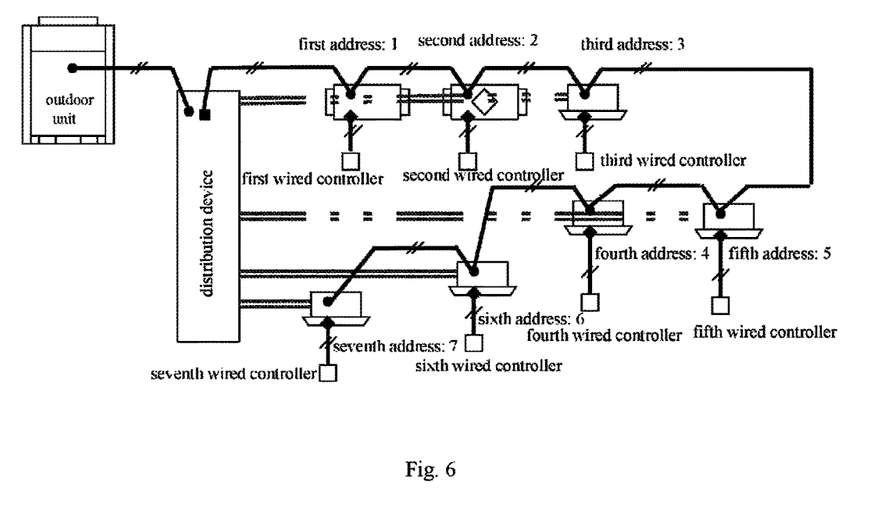
FIG. 6 is a communication network diagram of a multi-split system according to an embodiment of the present disclosure.

According to an embodiment of the present disclosure, as shown in FIG. 6, the outdoor unit and the distribution device may communicate with each other directly, and each indoor unit communicates with the outdoor unit through the distribution device. Each indoor unit is allocated with an address for convenience for the communications between individual indoor units and communications between each indoor unit and the distribution device, for example, the first indoor unit is allocated with a first address, and the second indoor unit is allocated with a second address, . . . , and the seventh indoor unit is allocated with a seventh address. In addition, each indoor unit further includes a wired controller, and each indoor unit further communicates with a respective wired controller.

Further, according to a specific example of the present disclosure, the outdoor controller in the outdoor unit communicates with the control module in the distribution device, meanwhile, the control module in the distribution device communicates with the indoor controllers in each indoor unit. The outdoor controller in the outdoor unit acquires temperature information of the outdoor unit (such as a temperature of the environment in which the outdoor unit is located, an exhausting temperature, a gas returning temperature, a heat exchange temperature, etc.), pressure information (such as an exhausting pressure, a gas returning pressure, etc.) and operating modes of each indoor unit sent by a plurality of indoor units and so on in real time to determine an operating mode of the multi-split system (such as a pure heating mode, a main heating mode, a pure cooling mode and a main cooling mode), and sends the instruction indicating the operating mode of the multi-split system to the distribution device. Meanwhile, the outdoor controller in the outdoor unit further controls the compressor and the outdoor fan, etc. to operate according to the inner logic output instruction signal.

Specifically, after the multi-split system is turned on, the outdoor controller in the outdoor unit acquires environment temperature information, pressure information of the outdoor unit and operating modes of each indoor unit to determine an operating mode of the multi-split system. For example, when each indoor unit operates under a cooling mode, the operating mode of the multi-split system is a pure cooling mode; when each indoor unit operates under a heating mode, the operating mode of the multi-split system is a pure heating mode; when there are both indoor units operating under a cooling mode and indoor units operating under a heating mode in the plurality of indoor units, the operating mode of the multi-split system is a simultaneous cooling and heating mode, and the outdoor unit sends corresponding mode instruction to the distribution device according to the determined operating mode of the system. Meanwhile, the outdoor unit controls the compressor and the outdoor fan, etc. to operate according to the inner logic output instruction signal. The distribution device controls each status parameter according to the mode instruction given by the outdoor unit.

Moreover, after the multi-split system starts operating for a second preset time, the distribution device controls the first electronic expansion valve by a preset medium-pressure initial control target value. The second preset time may be in a range of 10 to 20 minutes, preferably, may be 15 minutes.

Figure 7:
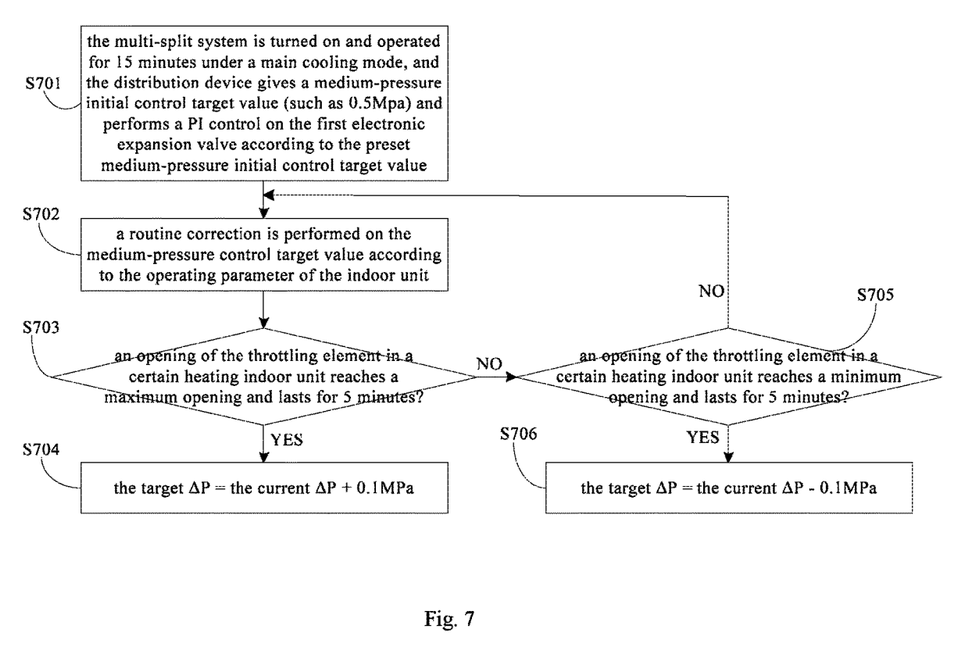
FIG. 7 is a flow chart of a medium-pressure controlling method of a first electronic expansion valve in a distribution device according to an embodiment of the present disclosure.

That is, as shown in FIG. 7, the flow of a medium-pressure controlling over the first electronic expansion valve in the distribution device includes steps as follows:

In the step S701, the multi-split system is turned on and operated for an initial time (such as 15 minutes) under a main cooling mode, and the distribution device gives a medium-pressure initial control target value (such as 0.5 Mpa) and performs a PI control on the first electronic expansion valve according to the preset medium-pressure initial control target value.

In the step S702, a routine correction is performed on the medium-pressure control target value according to the operating parameter of the indoor unit. Specifically, a PID adjustment is performed on the medium-pressure control target value of the first electronic expansion valve according to the subcooling degree of the heating indoor unit, the outlet air temperature of the heating indoor unit and the opening of the throttling element in the heating indoor unit.

That is, when the operating mode of the multi-split system is a main cooling mode, when the multi-split system operates for the initial time (such as in 15 minutes) under this mode, the distribution device 30 gives a medium-pressure initial control target value (such as 0.5 Mpa) and performs a PI control on the first electronic expansion valve according to this preset medium-pressure initial control target value. At this moment, the indoor unit operating under a cooling mode (i.e., a cooling indoor unit) performs a PI (proportional integral) control on the corresponding throttling element (such as an electronic expansion valve) according to a certain superheat degree (SH), and the indoor unit operating under a heating mode (i.e., a heating indoor unit) performs a PI control on the corresponding throttling element (such as an electronic expansion valve) according to a certain subcooling degree (SC). Meanwhile, the heating indoor unit sends a subcooling degree (SC), an opening of the throttling element and an outlet air temperature to the distribution device 30 at regular time intervals. The distribution device 30 performs a routine correction (i.e., PID adjustment) on the medium-pressure control target value according to the subcooling degree (SC), the opening of the throttling element and the outlet air temperature sent by the heating indoor unit.

In the step S703, whether there is an opening of the throttling element in a certain heating indoor unit which reaches a maximum opening and lasts for a first preset time (such as 5 minutes) is determined. If yes, the step S704 is performed; if no, the step S705 is performed.

In the step S704, the target ΔP=the current ΔP+0.1 MPa.

In the step S705, whether there is an opening of the throttling element in a certain heating indoor unit which reaches a minimum opening and lasts for a first preset time (such as 5 minutes) is determined. If yes, the step S706 is performed; if no, the step S702 is performed again.

In the step S706, the target ΔP=the current ΔP−0.1 MPa.

That is, when the time for which the multi-split system operates under a main cooling mode is longer than 15 minutes, the distribution device 30 determines according to openings of the throttling elements sent by each heating indoor unit. When there is an opening of the throttling element (i.e., an electronic expansion valve) in the heating indoor unit which reaches a maximum opening and lasts for a first preset time (such as 5 minutes), the refrigerant of this heating indoor unit is determined as insufficient, and therefore the current medium-pressure control target value (i.e., the current ΔP) needs to be increased, that is, the target ΔP=the current ΔP+0.1 MPa. When there is an opening of the throttling element (i.e., an electronic expansion valve) in the heating indoor unit which reaches a minimum opening and lasts for a first preset time (such as 5 minutes), the refrigerant of this heating indoor unit is determined as excessive, and therefore the current medium-pressure control target value (i.e., the current ΔP) needs to be decreased, that is, the target ΔP=the current ΔP−0.1 MPa. In the end, the distribution device performs a PI control on the first electronic expansion valve according to the corrected target ΔP.

Therefore, in embodiments of the present disclosure, when the multi-split system operates under a main cooling mode, if an opening of a throttling element in a certain heating indoor unit reaches a maximum opening or a minimum opening and lasts for some time, it means that the throttling element in this heating indoor unit is beyond the opening adjustment range. At this moment, the medium-pressure control target value needs to be corrected according to a preset step so as to make the refrigerants appropriately redistributed.

By the multi-split system according to embodiments of the present disclosure, the distribution device controls the first electronic expansion valve by a preset medium-pressure initial control target value first, then acquires a subcooling degree of the heating indoor unit in a plurality of indoor units, an outlet air temperature of the heating indoor unit and an opening of the throttling element in the heating indoor unit, and performs a routine correction on the medium-pressure control target value of the first electronic expansion valve according to the subcooling degree of the heating indoor unit, the outlet air temperature of the heating indoor unit and the opening of the throttling element in the heating indoor unit, and finally when the opening of the throttling element in the heating indoor unit reaches a maximum opening or a minimum opening and lasts for a first preset time, the distribution device performs an correction on the current medium-pressure control target value of the first electronic expansion valve according to a preset step, such that the medium-pressure control target value of the first electronic expansion valve may be corrected according to the opening of the throttling element in the operating heating indoor unit, and thus an appropriate distribution of a refrigerant flowing into the heating indoor unit may be newly realized, and a problem that the heating effect of the heating indoor unit is not good due to an uneven distribution of the refrigerant is solved, and the heating effect of the heating indoor unit is guaranteed.

Reference throughout this specification to "an embodiment", "some embodiments", "one embodiment", "an example", "a specific example", or "some examples" means that a particular feature, structure, material, or characteristic described in connection with the embodiment or example is included in at least one embodiment or example of the disclosure. In the descriptions, expressions of the above terms does not need for same embodiments or examples. Furthermore, the feature, structure, material, or characteristic described can be incorporated in a proper way in any one or more embodiments or examples. In addition, under non-conflicting condition, those skilled in the art can incorporate or combine features described in different embodiments or examples.

Although explanatory embodiments of the present disclosure have been shown and described, it would be appreciated by those skilled in the art that changes, corrections, alternatives, and modifications may be made in the embodiments without departing from spirit and principles of the present disclosure. Such changes, corrections, alternatives, and modifications all fall into the scope of the claims and their equivalents.

What is claimed is:

1. A multi-split system, comprising an outdoor unit, a distribution device, and a plurality of indoor units, wherein the distribution device comprises a gas-liquid separator, a first heat exchange assembly, a first electronic expansion valve, a second heat exchange assembly and a second electronic expansion valve, in which the distribution device is configured to control the first electronic expansion valve by a preset medium-pressure initial control target value, and to acquire a subcooling degree of a heating indoor unit in the plurality of indoor units, an outlet air temperature of the heating indoor unit and an opening of a throttling element in the heating indoor unit, and to perform a routine correction on a medium-pressure control target value of the first electronic expansion valve according to the subcooling degree of the heating indoor unit, the outlet air temperature of the heating indoor unit and the opening of the throttling element in the heating indoor unit, and to correct a current medium-pressure control target value of the first electronic expansion valve according to a preset step when the opening of the throttling element in the heating indoor unit reaches a maximum opening or a minimum opening and lasts for a first preset time.

2. The multi-split system according to claim 1, wherein if the opening of the throttling element in the heating indoor unit reaches the maximum opening and lasts for the first preset time, the distribution device increases the current medium-pressure control target value according to the preset step.

3. The multi-split system according to claim 2, wherein the first preset time is in a range of 4 to 6 minutes, and the preset step is in a range of 0.05 to 0.15 Mpa.

4. The multi-split system according to claim 1, wherein if the opening of the throttling element in the heating indoor unit reaches the minimum opening and lasts for the first preset time, the distribution device decreases the current medium-pressure control target value according to the preset step.

5. The multi-split system according to claim 4, wherein the first preset time is in a range of 4 to 6 minutes, and the preset step is in a range of 0.05 to 0.15 Mpa.

6. The multi-split system according to claim 1, wherein the first preset time is in a range of 4 to 6 minutes, and the preset step is in a range of 0.05 to 0.15 Mpa.

7. The multi-split system according to claim 1, wherein the multi-split system works under a main cooling mode.

8. The multi-split system according to claim 1, wherein when the multi-split system starts operating for a second preset time, the distribution device controls the first electronic expansion valve by the preset medium-pressure initial control target value.

9. The multi-split system according to claim 8, wherein the second preset time is in a range of 10 to 20 minutes.

10. A medium-pressure controlling method of a multi-split system, wherein the multi-split system comprises an outdoor unit, a distribution device and a plurality of indoor units, in which the distribution device comprises a gas-liquid separator, a first heat exchange assembly, a first electronic expansion valve, a second heat exchange assembly and a second electronic expansion valve, in which the medium-pressure controlling method comprises steps of:

controlling the first electronic expansion valve by a preset medium-pressure initial control target value when the multi-split system works under a main cooling mode;

acquiring a subcooling degree of a heating indoor unit in the plurality of indoor units, an outlet air temperature of the heating indoor unit and an opening of a throttling element in the heating indoor unit;

performing a routine correction on a medium-pressure control target value of the first electronic expansion valve according to the subcooling degree of the heating indoor unit, the outlet air temperature of the heating indoor unit and the opening of the throttling element in the heating indoor unit, and correcting a current medium-pressure control target value of the first electronic expansion valve according to a preset step when the opening of the throttling element in the heating indoor unit reaches a maximum opening or a minimum opening and lasts for a first preset time.

11. The medium-pressure controlling method of the multi-split system according to claim 10, wherein if the opening of the throttling element in the heating indoor unit reaches the maximum opening and lasts for the first preset time, the current medium-pressure control target value is increased according to the preset step.

12. The medium-pressure controlling method of the multi-split system according to claim 11, wherein the first preset time is in a range of 4 to 6 minutes, and the preset step is in a range of 0.05 to 0.15 Mpa.

13. The medium-pressure controlling method of the multi-split system according to claim 10, wherein if the opening of the throttling element in the heating indoor unit reaches the minimum opening and lasts for the first preset time, the current medium-pressure control target value is decreased according to the preset step.

14. The medium-pressure controlling method of the multi-split system according to claim 13, wherein the first preset time is in a range of 4 to 6 minutes, and the preset step is in a range of 0.05 to 0.15 Mpa.

15. The medium-pressure controlling method of the multi-split system according to claim 10, wherein the first preset time is in a range of 4 to 6 minutes, and the preset step is in a range of 0.05 to 0.15 Mpa.

16. The medium-pressure controlling method of the multi-split system according to claim 10, wherein when the multi-split system starts operating for a second preset time, the first electronic expansion valve is controlled by the preset medium-pressure initial control target value.

17. The medium-pressure controlling method of the multi-split system according to claim 16, wherein the second preset time is in a range of 10 to 20 minutes.

* * * * *